Patented July 3, 1923.

1,460,757

UNITED STATES PATENT OFFICE.

OTIS JOHNSON, OF SAN DIEGO, CALIFORNIA.

ADHESIVE.

No Drawing.     Application filed August 14, 1922. Serial No. 581,895.    REISSUED

*To all whom it may concern:*

Be it known that I, OTIS JOHNSON, a citizen of the United States, and a resident of San Diego, county of San Diego, State of California, have invented a new and useful Adhesive, of which the following is a specification.

My invention relates to an adhesive formula and the product produced therefrom.

I have discovered from experiments that a high class waterproof adhesive, such as so-called glue, may be realized from soya beans, or rather the residue derived from soya beans after the oily content of the beans has been extracted. This residue, I have found, contains a highly valuable adhesive constituent which provides an excellent base for an adhesive formula. One feature of the same resides in the fact that I can use either the residue as a whole, or else to realize a high grade product, I can extract by any suitable means the adhesive constituent of the residue.

In carrying out the invention, soya beans are first pressed, or otherwise treated, to extract their oily content and the resultant pressed cake is either finely ground, when the whole of the residue is to be used, or else it is treated to extract the adhesive constituent when the high grade adhesive is to be produced. This adhesive constituent, or even the finely ground pressed cake, may be considered as a base for my formula and the same, on account of its adhesive qualities, I will term a tacky substance. I compound the tacky substance with various other agents which may be those commonly used in the manufacture of adhesives, such as hydrated lime and sodium fluoride, the tacky substance and the two agents named being mixed in solution. I, of course, do not confine myself to hydrated lime and sodium fluoride, as any other agents having substantially the same characteristic qualities will be sufficient. In fact, entirely different agents may be used, but I have not as yet experimented further than the agents of this character. The hydrated lime is, of course, a waterproofing solvent and the sodium fluoride is a so-called liquefying agent; in other words, it prevents the compound from drying out. I have found that the following proportions give satisfactory results: About two and one-half to three parts hydrated lime, one part sodium fluoride, about ten parts of the tacky substance, and sufficient water to make up a solution of the desired consistency.

The term adhesive, or glue, should not be construed in either the specification or claims as limited to the ordinary accepted meaning of the term, as this tacky substance may be used to advantage in calcimine formulas and other instances where a strong adhesive is not necessarily required.

I have found in practice that by using this tacky substance I can produce a very cheap adhesive, and one that is far better than any that has been made by heretofore known formulas. Soya beans, or rather the residue, may be obtained at a very nominal cost and the treatment necessary to either grind the residue when it is used as a whole, or when it is treated to extract the adhesive constituent, is very simple. Consequently the base for the formula is realized without expensive equipment or other high cost.

I claim:

1. An adhesive composition comprising the tacky substance of the soya bean, and an alkali-metal liquefying agent.

2. An adhesive composition comprising the tacky substance of the soya bean, an alkali-metal liquefying agent, and a waterproofing agent.

3. An adhesive composition comprising the tacky substance of the soya bean, hydrated lime, and sodium fluoride.

4. The method of making an adhesive composition which consists in including therein the tacky substance of the soya bean.

5. The process of making an adhesive composition which consists in extracting the oil from the soya bean, and adding to the residue an alkali-metal liquefying agent.

6. The process of making an adhesive composition which consists in extracting the oil from the soya bean, and adding to the residue an alkali-metal liquefying agent and a waterproofing agent.

7. The process of making an adhesive composition which consists in extracting the oil from the soya bean, grinding the residue, and then adding to the finely ground residue, hydrated lime and sodium fluoride.

OTIS JOHNSON.